Patented June 16, 1925.

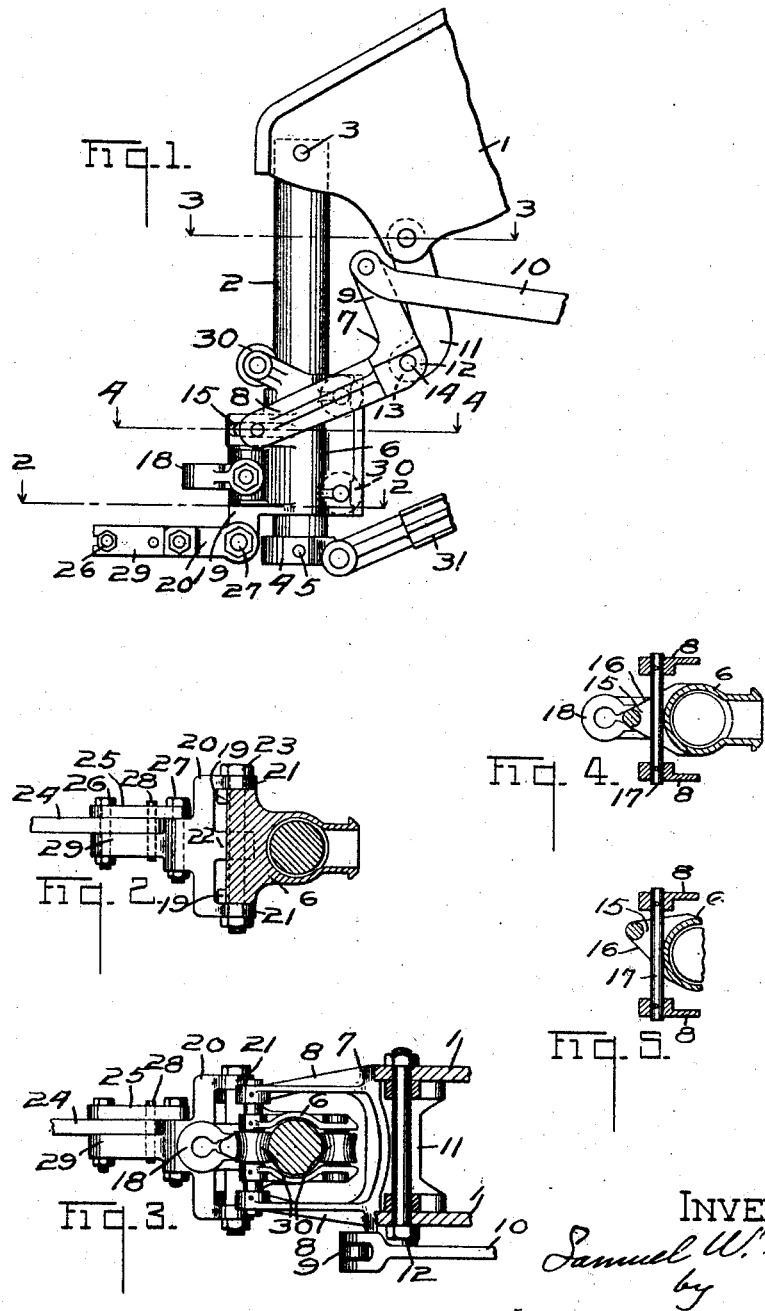

1,542,093

UNITED STATES PATENT OFFICE.

SAMUEL W. RAYMOND, OF ADRIAN, MICHIGAN.

ADJUSTABLE TRACTOR HITCH.

Application filed May 18, 1922. Serial No. 561,833.

*To all whom it may concern:*

Be it known that I, SAMUEL W. RAYMOND, a citizen of the United States, and a resident of Adrian, in the county of Lenawee and State of Michigan, have made an Invention Appertaining to an Adjustable Tractor Hitch; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention has for its object to provide a tractor hitch that may be readily adjusted to tongues or draw bars of different heights and may be used with advantage in connection with tractors for universal draft purposes, whereby implements, such as farm implements, of all kinds may be readily connected with the tractor. It is of particular advantage in connection with plows when drawn by tractors, whereby the plows may, by manipulation of the hitch blocks, be readily guided or controlled in their operations in turning the soil and so as to regulate the depth of the plow point. The invention also has for its object to provide a means in a tractor hitch block whereby the line of the cut produced by the plow may be readily adjusted relative to the tractor wheels so as to place one of the wheels that it will follow a line or path disposed sufficiently remote from a preceding cut of the plow in order that it may have a solid traction or footing for the said tractor wheel, and also whereby the distances between the cuts of the plow may be adjusted as desired, that is, according to the character of the soil that is to be turned by the plow. The invention also has for its object to provide in an adjustable hitch block a means whereby the plow or the implement, such as a wagon or other trailing device, may be turned, that is, whereby the tractor may take an angular position with reference to the trailing device. The invention consists in other features and has for its object other advantages that will appear from the following description and upon examination of the drawings.

The invention may be contained in structures of different forms. To illustrate a practical application of the invention I have selected a structure containing the invention and shall describe it hereinafter. The structure selected is shown in the accompanying drawings.

Figure 1 of the drawings illustrates a side view of the hitch block. Fig. 2 illustrates a sectional view taken on the line 2—2 indicated in Fig. 1. Fig. 3 illustrates a sectional view taken on the line 3—3 indicated in Fig. 1. Fig. 4 illustrates a sectional view taken on the line 4—4 indicated in Fig. 1, and Fig. 5 illustrates the position of parts of the device when the tractor is turning.

1, Figure 1, indicates the rear end of the tractor frame or housing, which may be of any suitable form, and to which the hitch block is connected. A cylindrical bar 2 is secured to the housing 1 by means of a pin 3 and by means of a collar 4 and a tension member or brace 31 which is also connected to the housing or other suitable part of the tractor. The tension member 31 may be made adjustable so as to maintain the cylindrical bar 2 in a suitable position, such as substantially perpendicular. The collar 4 may be secured to the bar 2 by the pin 5. The hitch block is movable along the bar 2 and the draft is through the bar. When, therefore, the bar is worn on one side or at one end, the bar 2 may be turned around or end-for-end by withdrawing and reinserting the pins 3 and 5.

The hitch block 6 is connected to a bell crank lever 7 which is bifurcated, that is, it is provided with two arms 8 located on opposite sides of the hitch block 6. The lever 7 is also provided with the arm 9 to which a link 10 is connected for manipulating the bell-crank-lever 7 to raise and lower the hitch block 6. The link 10 may be connected to any suitable device for swinging the bell-crank-lever, such as, to a lever or other mechanism, whereby the hitch block may be easily lifted or lowered.

The bell crank lever may be fulcrumed or pivotally supported on a broad dependent member fixedly secured to or forming a part of the housing or frame of the tractor or it may be pivotally connected to the broad webbed link 11 which is pivotally connected to the housing 1. The link 11 is located between webs or sides of the housing and between forwardly projecting ears 12 of the lever 7. The arm 9 of the lever 7 extends from one of the ears 12 to connect with the link 10.

The link 11 is provided with rearwardly extending lugs or bosses 13 which are located between the ears 12 and are so disposed as to form lateral bearing surfaces with the ears 12 of the lever 7. The link and the lever are connected together by means of the pin 14 that extends through the ears and the lugs. This forms a pivotal and lateral rigid connection between the link and the lever and readily permits vertical movements of the hitch block 6 by the angular movements of the lever 7, ample room for swinging movements of the block 6 being provided by reason of the position of the arms 8 of the lever relative to the block.

The block 6 is provided with a transversely extending slot 15 located in a rearwardly extending V shaped projection 16. A pin 17 extends through the ends of the arms 8 of the lever 7 and thus connects the lever with the hitch block 6. The end corners of the slot 15 are cut away, as shown in Figs. 4 and 5, to permit the block 6 to take extreme angular positions on the cylindrical bar 2 notwithstanding the elevation of the pin 17 and the slot 15. The slot 15 has a vertical width substantially the same as the diameter of the pin 17. The pin 17, when moved by the lever 7, operates to raise and lower the hitch block 6 without interfering with the angular movements of the block 6 when the tractor is turning and drawing the trailing device.

An eye 18 may be bolted to the hitch block for connecting to any desired agricultural implement or other trailing device. For hitching a plow to the trailing device, the block 6 is provided with downwardly extending lugs 19. A clevis 20 is provided with two outside ears or lugs 21 and a central lug 22. The clevis and the hitch block are connected together by means of the pin 23 that extends through the lugs and ears of the clevis and the hitch. The plow beam 24 is secured to the clevis 20 by means of the plate 25 and the bolts 26 and 27 and the wooden pin 28. The bolts 26 and 27 operate to clamp the end of the plow beam between the plate 25 and an extension or shank 29 of the clevis. The downwardly extending lugs 19 permit pivotal movements of the plow beam relative to the hitch block 6 about the pin 23 and lateral adjustments of the plow are obtained by the relative location of the ears of the clevis and the lugs of the hitch block, and consequently desired widths of land turned may be obtained, or desired adjustments as between the line of cut of the plow and the path of one of the bull wheels of the tractor may be made. One of the ears 21 may be located against the inside surface of one of the lugs 19, which will bring the central ear 22 in contact with the inside surface of the other lug 19. This will give two adjustments and yet the lugs and ears of the hitch block and the clevis are maintained in contact with each other so as to give lateral rigidity between the two. These adjustments may be further extended to two additional adjustments by locating the plow beam 24 on one or the other side of the shank 29 of the clevis, which will give four adjustments of the plow beam relative to the hitch block and produce the desired results in the operation of the plow.

To prevent binding between the hitch block 6 and the rod 2 by reason of the draft produced in hauling the trailing device, rollers 30 may be pivotally secured in the block 6 so as to bear against the surface of the cylindrical bar 2. This permits free movement of the hitch block 6 along the bar 2 by the operation of the link 10 notwithstanding the draft that the lower rear corner of the hitch block may be subjected to.

I claim:

1. In a tractor hitch, a vertical member connected to the tractor, a hitch block suitably located on the member and rotatable relative thereto, a bifurcated lever having arms located on opposite sides of the hitch block and connected to the hitch block for raising and lowering the hitch block.

2. In a tractor hitch, a member connected to the tractor, a hitch block slidably located on the member and rotatable relative thereto, a bifurcated lever having arms located on opposite sides of the hitch block and connected to the hitch block, a link connected to the tractor and the lever at its fulcrum for supporting the lever.

3. In a tractor hitch, a vertical member connected to the tractor, a hitch block slidably located on the member and rotatable relative thereto, a bifurcated lever having arms located on opposite sides of the hitch block and connected to the hitch block, a link connected to the tractor and the lever for supporting the lever, and rollers located on the hitch block and bearing against the member to prevent binding between the hitch block and the member.

4. In a tractor hitch, a vertical member connected to the tractor, a hitch block slidable along and rotatively connected to the member, a bifurcated bell crank lever connected to the hitch block and having arms located on opposite sides of the hitch block, a link having a width substantially the same as the greater width of the lever and connected to the lever and the tractor for supporting the lever and giving lateral rigidity to the lever, the hitch block rotatable within the arms of the lever.

5. In a tractor hitch, a vertical member connected to the tractor, a hitch block slidable along and rotatively connected to the member, a bifurcated bell crank lever, the block and lever having a pin and slot for connecting the block and lever together, a link having a width substantially the same as the greater width of the lever and connected to the lever and the tractor for supporting the lever and giving lateral rigidity to the lever, the hitch block rotatable within the arms of the lever.

In testimony whereof I have hereunto signed my name to this specification.

SAMUEL W. RAYMOND.